US010908673B2

(12) United States Patent
Meinerzhagen et al.

(10) Patent No.: US 10,908,673 B2
(45) Date of Patent: Feb. 2, 2021

(54) RELIABLE DIGITAL LOW DROPOUT VOLTAGE REGULATOR

(71) Applicant: Intel Corporation, Santa Clara, CA (US)

(72) Inventors: Pascal Meinerzhagen, Hillsboro, OR (US); Stephen Kim, Hillsboro, OR (US); Dongmin Yoon, Ann Arbor, MI (US); Minki Cho, Hillsboro, OR (US); Muhammad Khellah, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 15/891,081

(22) Filed: Feb. 7, 2018

(65) Prior Publication Data

US 2019/0243440 A1 Aug. 8, 2019

(51) Int. Cl.

| | |
|---|---|
| ***G06F 1/32*** | (2019.01) |
| ***G05F 1/563*** | (2006.01) |
| ***G05F 1/59*** | (2006.01) |
| ***G06F 1/3296*** | (2019.01) |
| ***G06F 1/3287*** | (2019.01) |
| ***G06F 1/3234*** | (2019.01) |
| ***G06F 1/324*** | (2019.01) |

(52) U.S. Cl.

CPC ............ *G06F 1/3296* (2013.01); *G05F 1/563* (2013.01); *G05F 1/59* (2013.01); *G06F 1/324* (2013.01); *G06F 1/3243* (2013.01); *G06F 1/3287* (2013.01)

(58) Field of Classification Search

None

See application file for complete search history.

(56) References Cited

U.S. PATENT DOCUMENTS

| | | | |
|---|---|---|---|
| 10,333,379 B2 | 6/2019 | Sutanthavibul et al. | |
| 2007/0030057 A1 | 2/2007 | Wang et al. | |
| 2009/0199023 A1* | 8/2009 | Lee | G06F 1/26 713/300 |
| 2009/0237107 A1 | 9/2009 | Lee et al. | |
| 2012/0119717 A1 | 5/2012 | Bose et al. | |
| 2013/0293282 A1 | 11/2013 | Rotem et al. | |
| 2014/0223205 A1* | 8/2014 | Muthukaruppan | G06F 1/32 713/320 |
| 2014/0277812 A1 | 9/2014 | Shih et al. | |

(Continued)

OTHER PUBLICATIONS

International Search Report & Written Opinion dated Apr. 30, 2019 for PCT Patent Application No. PCT/US2019/012561.

(Continued)

*Primary Examiner* — Jared Fureman
*Assistant Examiner* — Aqeel H Bukhari
(74) *Attorney, Agent, or Firm* — Green, Howard & Mughal LLP

(57) ABSTRACT

An apparatus is provided which comprises: a first device coupled to a first power supply rail; a second device coupled in series with the first device, wherein the second device is coupled to a second power supply rail; and a third device coupled to the first and second power supply rails, wherein the first device is controllable by a first input, wherein the second device is controllable by a second input, wherein the third device is controllable by a third input, and wherein the first input is an analog bias between a high power supply level and a ground supply level.

20 Claims, 12 Drawing Sheets

100
103a
102
North control signals: (e.g., nclk, ninc, nensec, asyncset, asyncrst, nlastffq, Vud, ... )
Vout sensors: Comparators (e.g., w/ Vref1, Vref2) and/or TRC with TDC
Central Controller
South control signals: (e.g., sclk, sinc, sensec, asyncset, asyncrst, slastffq, Vud, ... )
101
103b

(56) References Cited

U.S. PATENT DOCUMENTS

| | | | |
|---|---|---|---|
| 2015/0149794 | A1 | 5/2015 | Zelikson et al. |
| 2018/0024761 | A1 | 1/2018 | Meinerzhagen et al. |

OTHER PUBLICATIONS

Cho, M. et al., "Postsilicon Voltage Guard—Band Reduction in a 22 nm Graphics Execution Core Using Adaptive Voltage Scaling and Dynamic Power Gating", IEEE Journal of Solid-State Circuits 52, No. 1 (2017): 50-63.

Muthukaruppan, R. et al., "A digitally controlled linear regulator for per-core wide-range DVFS of atom™ cores in 14nm tri-gate CMOS featuring non-linear control, adaptive gain and code roaming", ESSCIR 2017—43rd IEEE European Solid State Circuits Conference, Leuven, 2017, pp. 275-278.

Nasir, S., "A 0.13μm fully digital low-dropout regulator with adaptive control and reduced dynamic stability for ultra-wide dynamic range", 2015 IEEE International Solid-State Circuits Conference—(ISSCC) Digest of Technical Papers, San Francisco, CA, 2015, pp. 1-3.

Shibahara, S., "A 16nm finFET heterogenous nona-core SoC supporting ISO26262 ASIL B standard", IEEE J. Solid-State Circuits, vol. 52, No. 1, pp. 77-88, Jan. 2017.

International Preliminary Report on Patentability dated Aug. 20, 2020 for PCT Patent Application No. PCT/2019/012561.

* cited by examiner

FF
Up/down
(e.g., controller output ninc)

CLK off
CLK on
To North/South
From center
'1'
'0'
403a
403b
400

RELIABLE DIGITAL LOW DROPOUT VOLTAGE REGULATOR

BACKGROUND

Digital low-dropout (DLDO) voltage regulators (VRs) are used to enable dynamic voltage and frequency scaling (DVFS) in modern systems-on-chip (SoCs), where different circuit/logic blocks operate at different voltage/frequency (V/F) operating points while being supplied by a shared input rail, VCCin.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
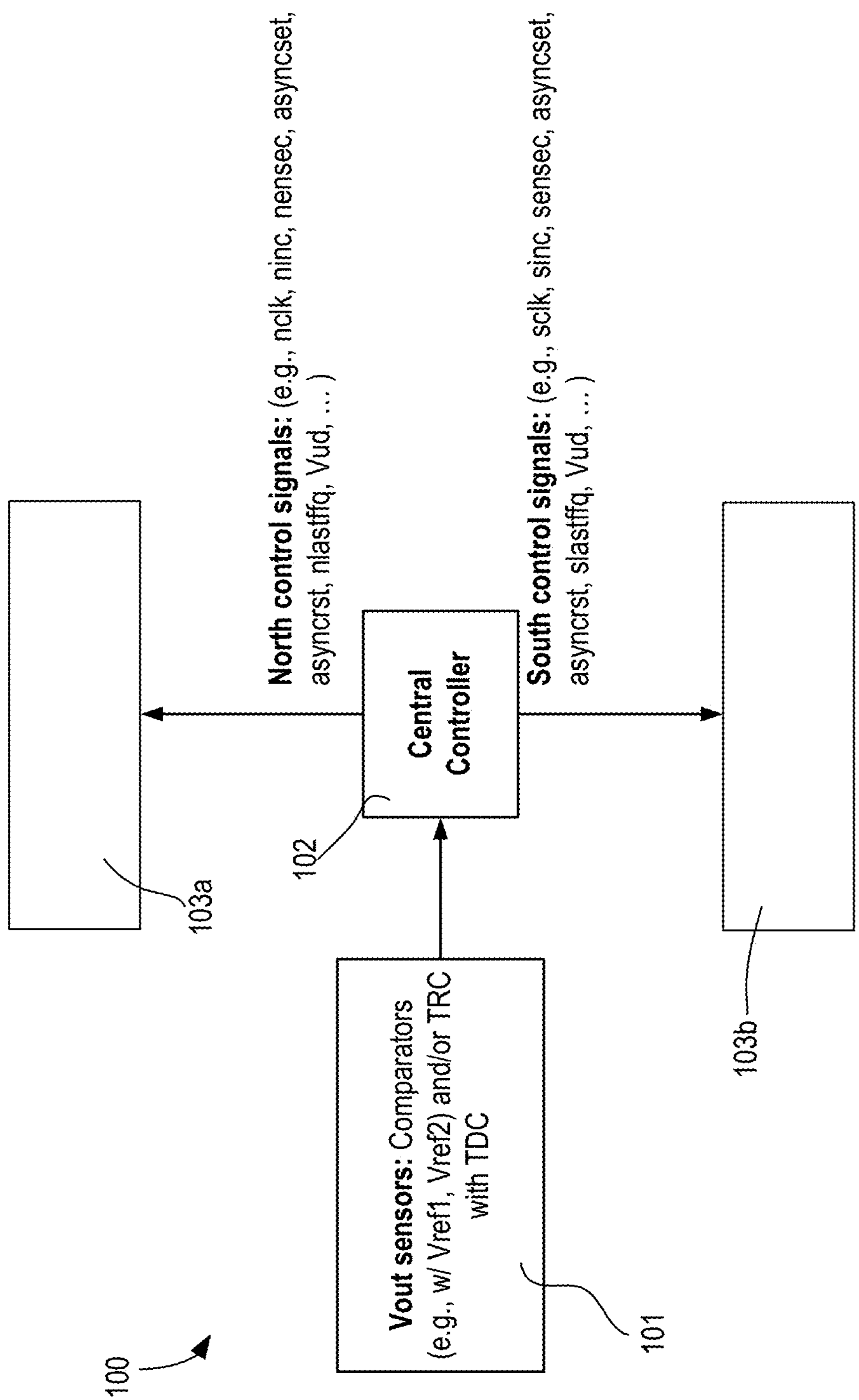
FIG. 1 illustrates a high level architecture of a digital low dropout (DLDO) voltage regular, according to some embodiments of the disclosure.

DLDOs are expected to regulate their output voltage, Vout, for widely varying load currents (e.g., from idle to "power virus" currents) and for different input supplies VCCin and dropout levels, while maintaining low Vout ripple, high current and power efficiencies, and while avoiding fin self-heating (FiSH) and electro-migration (EM) risks. FiSH is an increasingly dominant problem in aggressively scaled FinFET technologies. DLDOs are often requested to service a large circuit block while a strictly limited amount of top metal resources can be allocated for the output rail Vout, since these least resistive top metal resources are in high demand by other circuits of the SoC. Implementation of DLDOs may also be expected to hardly impact SoC design methodologies, based on logic synthesis and automated place and route techniques.

Unfortunately, under light-load conditions or for high dropout, merely a small number of power gates (PGs) in the DLDO are turned on, which leads to excessively high current densities and reliability risks (e.g., FiSH and EM risks) in these active PGs. Furthermore, it is challenging to maintain low Vout ripple for high dropouts in a DLDO where all PGs are controlled digitally. Moreover, the power overhead of the DLDO controller might limit the DLDO power efficiency under light load conditions. Also, most DLDOs are implemented as lumped designs, with PG banks at the top and/or bottom of their service area, which may use excessive top metal resources to limit the IR voltage drop within the Vout rail in case of large service/block areas; the IR voltage drop problem in the Vout rail manifests itself even already for smaller blocks such as graphics processor execution units (EUs). Further, many DLDOs use voltage comparators, (e.g., using analog reference voltage generation and routing), and may therefore not easily be integrated into a digital design flow.

Some embodiments describe a DLDO design which alleviates the abovementioned problems. Compared to typical LDOs, the DLDO of various embodiments comprises distributed PG units. Typical LDOs use two voltage comparators to enable fine-grain and coarse-grain control loops, a time-to-digital converter (TDC) for droop detection only and not for fine-grain control, an expensive code rotation scheme to reduce EM and FiSH risk, relatively coarse-grain clock gating in DLDO controller, slow open-loop dynamic power gating (DPG) or digitally driven DPG with limited tuning capability and with EM and FiSH risks. Conversely, the DLDO of various embodiments comprises distributed PG units, including of a primary PG (with under-drive voltage Vud) in parallel to a secondary PG (SPG), low controller overhead (e.g., achieved by fine-grain clock gating and shared flip-flop to control PPG and SPG), dynamic power gating (DPG) mode (e.g., a primitive DLDO mode for creating a load line effect for power reduction) enabled by Vud adjustment, and tunable replica circuit (TRC) with a single TDC for both fine-grain and coarse-grain DLDO control.

The DLDO of some embodiments provides fine-grain and coarse-grain control loops by using a single fully digital TRC with integrated TDC instead of two voltage comparators. The DLDO of some embodiments uses a TRC and a single TDC to not only detect and mitigate voltage droops, but also to regulate the DLDO output under steady-state conditions. The DLDO of some embodiments is fully digitally controlled despite the under-drive voltage Vud used to reduce FiSH and EM exposure. The DLDO of some embodiments uses an under-drive voltage to avoid EM and FiSH issues, which is simpler to implement than code rotation or code roaming techniques, and entails lower area and power overheads. The DLDOs of some embodiments exhibits fine-grain clock gating. For example, the clock can be gated at an exact boundary between flip-flops which may use an active clock and those which do not use to be clocked anymore. The DLDO of some embodiments achieves faster dynamic PG strength adjustment by switching between different under-drive voltages of the primary PG.

In one example, as opposed to using core states to trigger PG strength adjustment, the DLDO of some embodiments can use voltage comparators and/or TRCs to detect load conditions in general, and voltage droops in particular, and trigger PG strength adjustment in response. The DLDO of some embodiments uses an under-drive voltage for the primary PG to dynamically adjust its strength, which provides finer PG strength adjustment capability and, at the same time, helps to avoid primary PG FiSH and EM risks.

The DLDO of some embodiments enables energy-efficient implementation of dynamic voltage and frequency scaling (DVFS) while ensuring power gate (PG) reliability by minimizing FiSH and EM exposure and relaxing the need for metal resources, for widely varying load and dropout and implementation in the most advanced CMOS nodes. Furthermore, the DLDO implementation is compatible with digital design flow, easing its integration and reducing design time. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described, but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

FIG. 1 illustrates a high level architecture 100 of a digital low dropout (DLDO) voltage regular, according to some embodiments of the disclosure. Architecture 100 illustrates a distributed DLDO scheme which comprises sensors 101, controller 102, and power gates 103*a/b* controlled by sequential logic. The DLDO can be integrated into a partition such as a graphics processor execution unit (EU) and leverages existing distributed power gates (PGs), in accordance with some embodiments.

In some embodiments, sensors 101 are coupled to an output supply rail or the gated supply rail which is coupled to the power gates. The power gates are also coupled to an input supply rail or an ungated supply rail. In some embodiments, sensors 101 comprises voltage sensors to sense the voltage level on the output supply rail. These voltage sensors can be implemented in various ways.

In some embodiments, the voltage sensors 101 comprise analog voltage comparators with reference voltages Vref1 and Vref2 for fine-grain and coarse-grain control, respectively. For example, the comparators compare the voltage on the output supply rail (which provides power to the loads) with the reference voltages to determine whether PGs need to be turned on or off to adjust the voltage on the output supply rail. In some embodiments, the voltage sensor 101 comprises a TRC (e.g., a single TRC) with TDC which replaces both voltage comparators. Different bits of the TDC code can be used for the fine-grain and coarse-grain control loops, for example.

In some embodiments, the output(s) of the sensor(s) 101 are processed by controller 102, which generates control signals to turn on/off half rows of PGs as part of the fine-grain (linear) control loop, or many/all PGs as part of the coarse-grain (non-linear) control loop which is triggered at the onset of a voltage droop. In some embodiments, controller 102 comprises a counter, which determines how many PGs are on/off. In some embodiments, the counter is implemented as a distributed shift register, split into sections 103*a* and 103*b* e.g., North and South sections 103*a* and 103*b*, respectively. In one example, increment signals (ninc or sinc) are alternatively sent to North and South sections 103*a* and 103*b*, respectively. In some embodiments, PGs are turned on starting from the top and bottom edges of the physical partition, and then central PGs are turned on last. In one such embodiment, the sensors 101 are located in the center of the partition to see the worst IR voltage droop within the output supply rail (also referred to as the Vout rail).

Figure 2A:
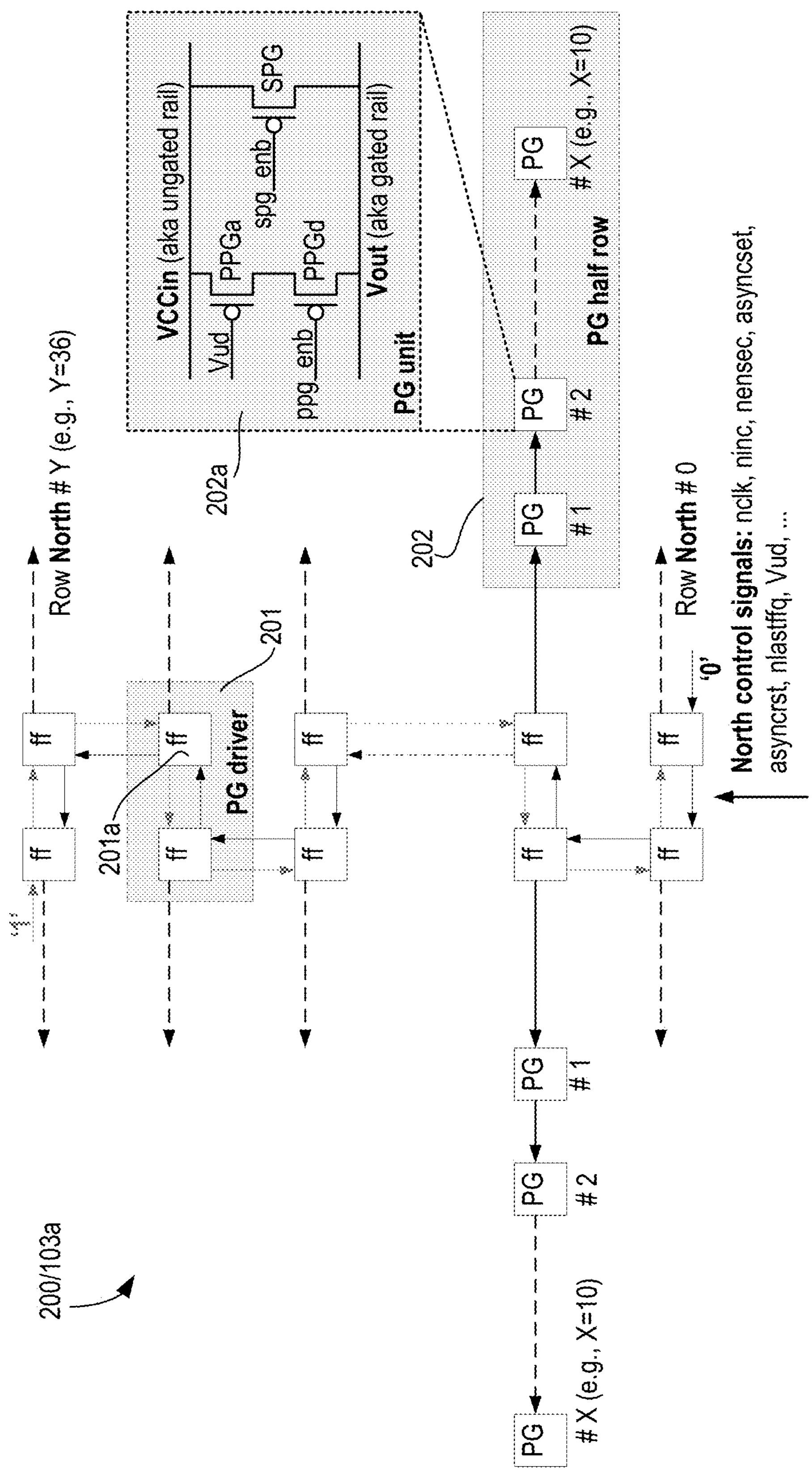
FIG. 2A illustrates a first portion of a distributed DLDO architecture of FIG. 1, according to some embodiments.

FIG. 2A illustrates a first portion 200 (e.g., North section 103*a*) of the distributed DLDO architecture of FIG. 1, according to some embodiments. Here, first portion 200 comprises power gate (PG) driver cells 201 and half a row of PGs 201. In one example, each section has rows of PGs. In some embodiments PG driver cell 201 controls one row of PGs 201, at the granularity of half rows. In some embodiments, PG driver cell 201 comprises two flip-flops 201*a* to control each half a row of PGs. In some embodiments, all PG driver cells together form shift registers in the North and South sections 103*a/b*.

In some embodiments, the PG unit 202*a* comprises primary PG (PPG) devices (e.g., PPGa and PPGd) and a secondary PG (SPG). In some embodiments, PPG (comprising of PPGa and PPGd) is coupled to the input supply rail (VCCin also referred to as the ungated power supply rail) and the output supply rail (e.g., Vout also referred to as the gated power supply rail). In some embodiments, SPG is coupled in parallel to the combined PPGs. In some embodiments, the SPG is used during a bypass mode or in case of extremely high load currents. Here, bypass mode refers to a high performance mode such as a Turbo mode where the load demands higher current and/or voltage and/or operating frequency.

In some embodiments, PPGd is driven digitally, and PPGa is driven by an analog signal/voltage or bias, namely the under-drive voltage Vud. An analog signal is any continuous signal for which the time varying feature (variable) of the signal is a representation of some other time varying quantity, i.e., analogous to another time varying signal. A digital signal is a physical signal that is a representation of a sequence of discrete values (a quantified discrete-time signal), for example of an arbitrary bit stream, or of a digitized (sampled and analog-to-digital converted) analog signal.

Under most operating conditions, the DLDO works with PPGs only, with Vud being set to avoid FiSH and EM risks while enabling an accurate set point, low Vout ripple, and high dropout if required. In some embodiments, if the PPGs are fully utilized under high load conditions or for very low dropouts (where FiSH/EM are less of a concern), the DLDO controller may start to turn on SPGs.

Figure 2B:
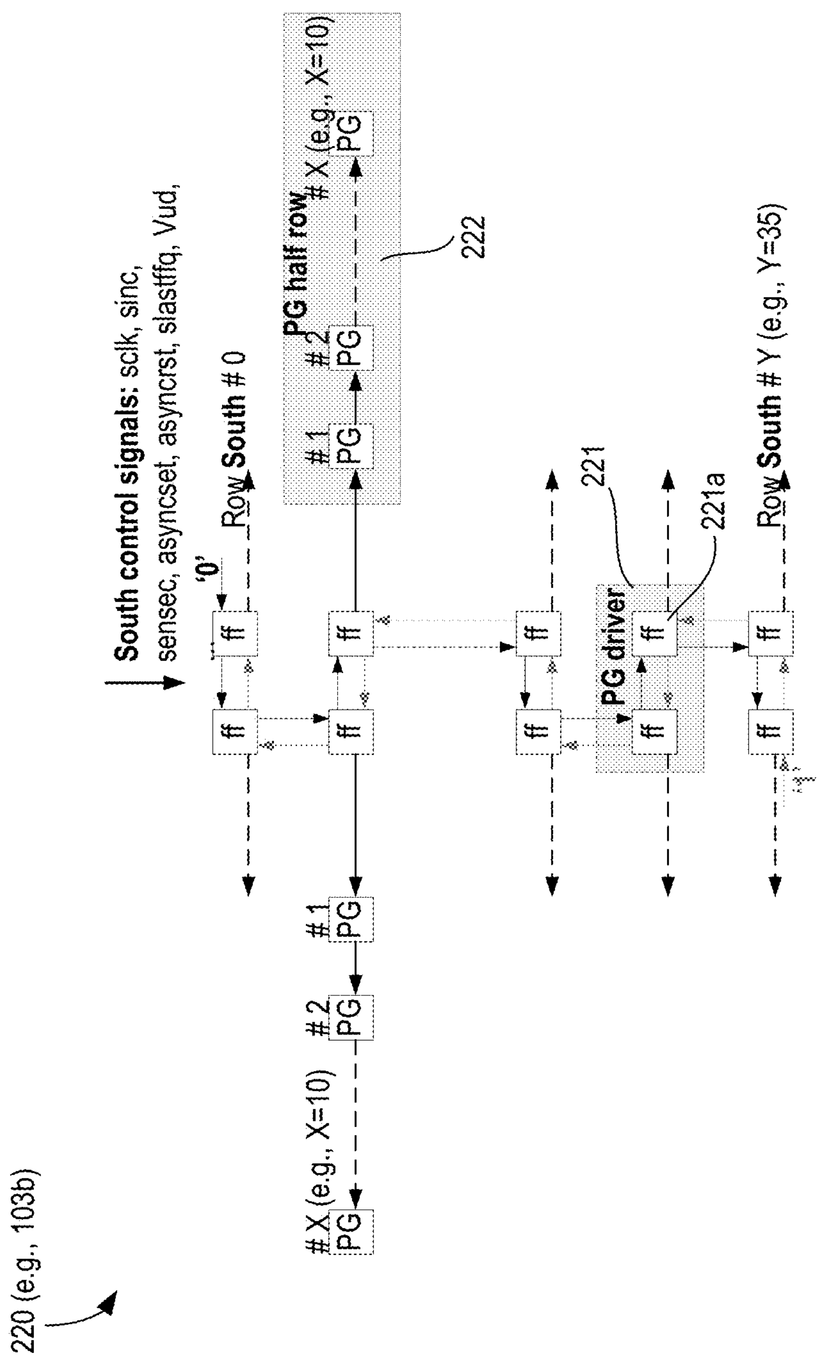
FIG. 2B illustrates a second portion of the distributed DLDO architecture of FIG. 1, according to some embodiments.

FIG. 2B illustrates a second portion 220 (e.g., South section 103*b*) of the distributed DLDO architecture of FIG. 1, according to some embodiments. Second portion 220 is similar to the first portion 200 where PG driver is labeled as 221 having flip-flops 221*a*, while the PG half row is labeled as 222.

Figure 3A:
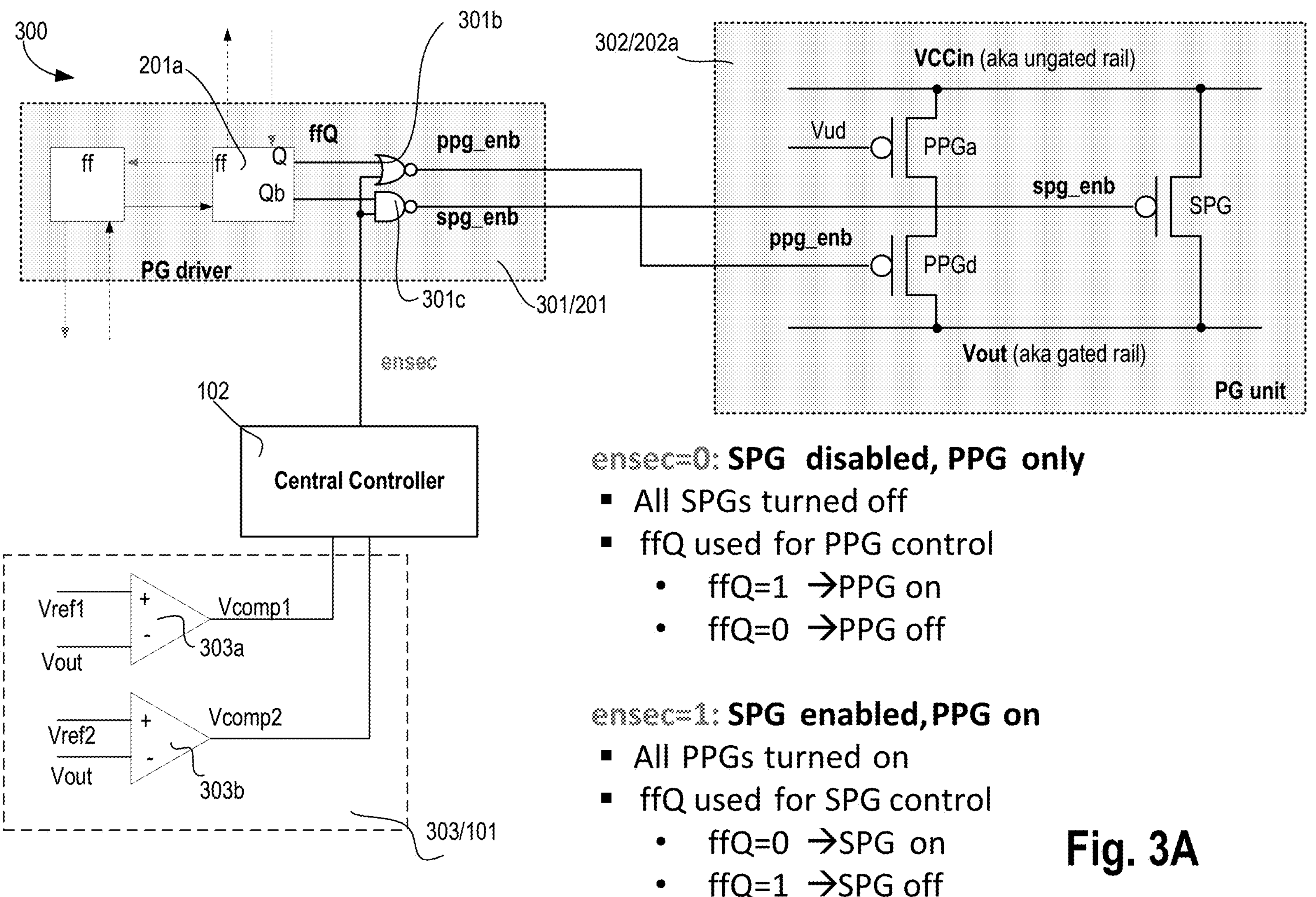
FIG. 3A illustrates a schematic of a power-gate unit and associated driver of the distributed DLDO architecture of FIG. 1, wherein the driver is controllable by a comparing circuitry, according to some embodiments of the disclosure.

FIG. 3A illustrates schematic 300 of a power-gate unit 302/202*a* and associated driver 301/201 of the distributed DLDO architecture of FIG. 1, wherein the driver is controllable by a comparing circuitry 303/301, according to some embodiments of the disclosure. In some embodiments, PG driver 301/201 comprises flip-flop 201*a*, NOR gate 301*b*, and NAND gate 301*c*. In this example, the output ppg_enb of NOR gate 301*b* controls the power gate PPGd, and the output spg_enb of NAND gate 301*c* controls the power gate SPG. The other flip-flop coupled to the flip-flop 201*a* is part of a shift register. Schematic 300 shows how a single flop 201*a* in the PG driver 301 is used to control both the PPG and the SPG in its associated half row of PGs.

In some embodiments, comparing circuitry 303/101 comprises a first comparator 303*a* and a second comparator 303*b*. In some embodiments, first and second comparators 303*a/b*, respectively, compare the output voltage Vout on the output supply line against upper and lower thresholds Vref1 and Vref2, respectively. The outputs Vcomp1 and Vcomp2 of the first and second comparators 303*a/b*, respectively, inform controller 102 whether the output voltage on the output supply rail is within the thresholds or outside any one of thresholds Vref1 or Vref2. In general, Vout is regulated to Vref1. If Vout falls to a value below Vref2, droop mitigation process is enabled. In one such example, Vout may not be monitored to be between Vref1 and Vref2. Rather, Vout is to be substantially equal to Vref1, for example. The controller 102 then sets a logic level for ensec (enable secondary power gate) according to the outputs Vcomp1 and Vcomp2 of the first and second comparators 303*a/b*, respectively.

In some embodiments, the centrally generated signal ensec (standing for enable secondary PG) alters the meaning of the value stored in the flip-flop 201*a*. In this example, if ensec=0, all SPGs are disabled, and the DLDO regulates the number of PPGs which are turned on. Here, when the output ffQ of flip-flop 201*a* is logic '1', ppg_enb is logic '0' which turns on the primary power gate device PPGd. In some embodiments, when the output ffQ of flip-flop 201*a* is logic '0', ppg_enb is logic '1' which turns off the primary power gate device PPGd.

In some embodiments, if the PPGs are fully utilized, ensec is set to 1. In this case, all PPGs remain on while the flop is now used to regulate the number of SPGs which are turned on. In some embodiments, the output ffQ of flip-flop 201*a* is logic '0', spg_enb is logic '0' which turns on the secondary power gate device SPG. In some embodiments, when the output ffQ of flip-flop 201*a* is logic '1', spg_enb is logic '1' which turns off the secondary power gate device SPG. The single flip-flop scheme of some embodiments significantly reduces area and power compared to a more straightforward approach where separate flops are used to control PPGs and SPGs.

Figure 3B:
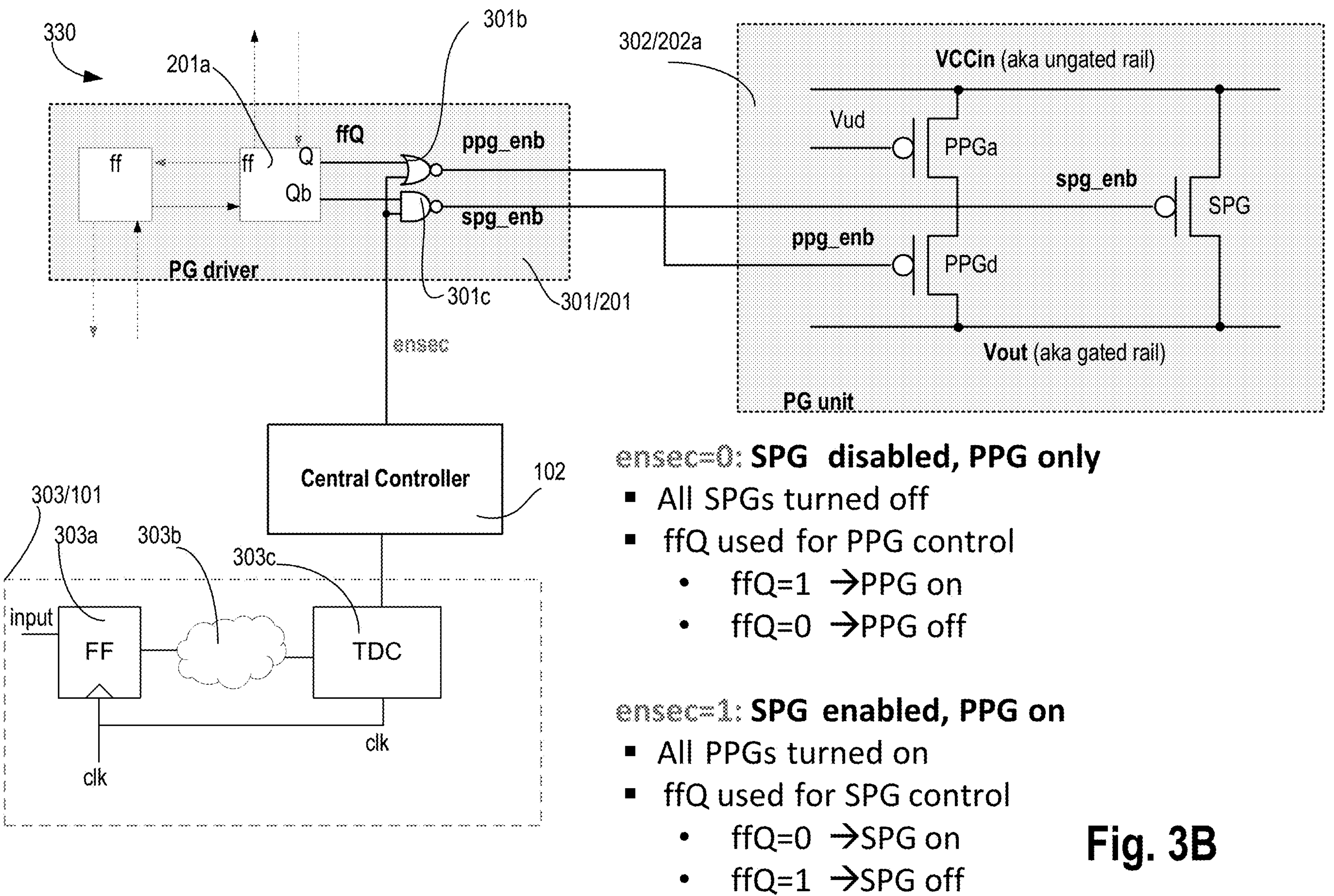
FIG. 3B illustrates a schematic of a power-gate unit and associated driver of the distributed DLDO architecture of FIG. 1, wherein the driver is controllable by tunable replica circuit and a time-to-digital converter, according to some embodiments of the disclosure.

FIG. 3B illustrates a schematic of a power-gate unit and associated driver of the distributed DLDO architecture of FIG. 1, wherein the driver is controllable by a tunable replica circuit and a time-to-digital converter (TDC), according to some embodiments of the disclosure. Operation wise, the impact of ensec is same as that described with reference to FIG. 3A. However, here the logic level of ensec is determined by a tunable replica circuit and TDC 303*c*.

In some embodiments, the tunable replica circuit mimics the electrical characteristics (e.g., propagation delay, timing margin, device sizes, etc.) of a critical timing path in a logic or processor which is powered by the power supplied by the output power supply rail. In some embodiments, the replica tunable circuit comprises an input flip-flop or latch 303*a* and combinational logic 303*b*. The same clock clk is used to sample the data of the input flip-flop or latch 303*a* and for the TDC 303*c*. The combinational logic may include any set of devices to mimic the propagation delay and device characteristics of the critical timing path. A person skilled in the art would appreciate that a critical timing path is a path that sets the maximum frequency of operation of a logic or circuit. If a clock frequency or sampling frequency is increased further, the timing constraints (e.g., setup time) may be violated for the critical timing path.

In some embodiments, TDC 303*d* measures the remaining time in the clock cycle, after the output signal of flip-flop 303*a* has propagated through combinational logic (and/or interconnects) 303*b*. If the remaining time in the clock cycle is long, then Vout is lowered by turning PGs off. If there is little or no remaining time in the clock cycle, then Vout is raised by turning on more power gates. The output of TDC 303*d* is processed by controller 102 to determine if PGs need to be turned on or off, and to set the logic level of ensec. When a setup violation is detected, then more power gates (first PPGs, then SPGs if required) are turned on to raise the voltage level of Vout on the output supply rail.

Figure 4:
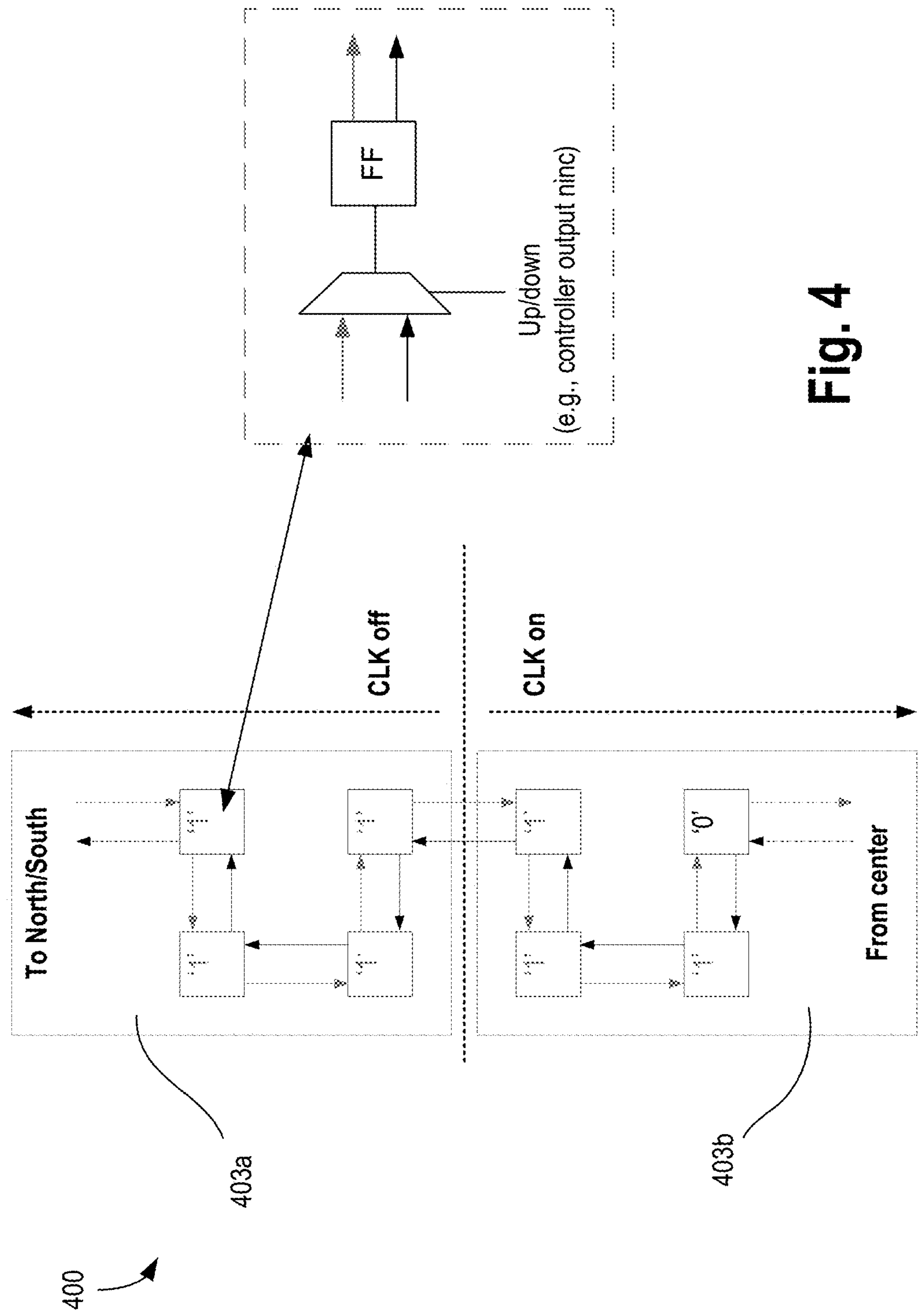
FIG. 4 illustrates an example of a clock gating methodology in a distributed shift register used for the distributed DLDO architecture of FIG. 1, according to some embodiments of the disclosure.

FIG. 4 illustrates an example of a clock gating methodology 400 in a distributed shift register used for the distributed DLDO architecture of FIG. 1, according to some embodiments of the disclosure. In some embodiments, each PG driver contains a clock gate which stops the clock if the flops in both neighboring PG drivers all hold the same value. For example, only the PG drivers which might be updated in the next voltage regulator (VR) clock cycle are required to pass through the centrally generated clock need to be clocked. In some embodiments, some PG drivers are clock gated. In various embodiments, clock gating is performed at the fine granularity of single PG drivers. In this example, clock CLK is gated (e.g., clock is not toggling or is off) for section 403*a* where neighboring PG drivers hold the same value '1' in their flip-flops. Each box inside section 403 may comprise a multiplexer coupled to a flip-flop, wherein the multiplexer is controllable by a controller output which selectively provides either the dark or the gray input to the flip-flop, wherein the dark input indicates the value of a more central flip-flop in the distributed shift register and the gray input indicates the value of a more remote flip-flop in the distributed shift register. In this example, clock CLK is not gated (e.g., CLK is toggling or is on) for section 403*b* where at least one neighboring PG driver holds a different value in one of its flip-flops. The output ffQ and ffQ bar (e.g., inverse of output ffQ) of the flip-flip is then received by NOR/NAND gates 301*b/c*, respectively, to control the power gates.

Figure 5:
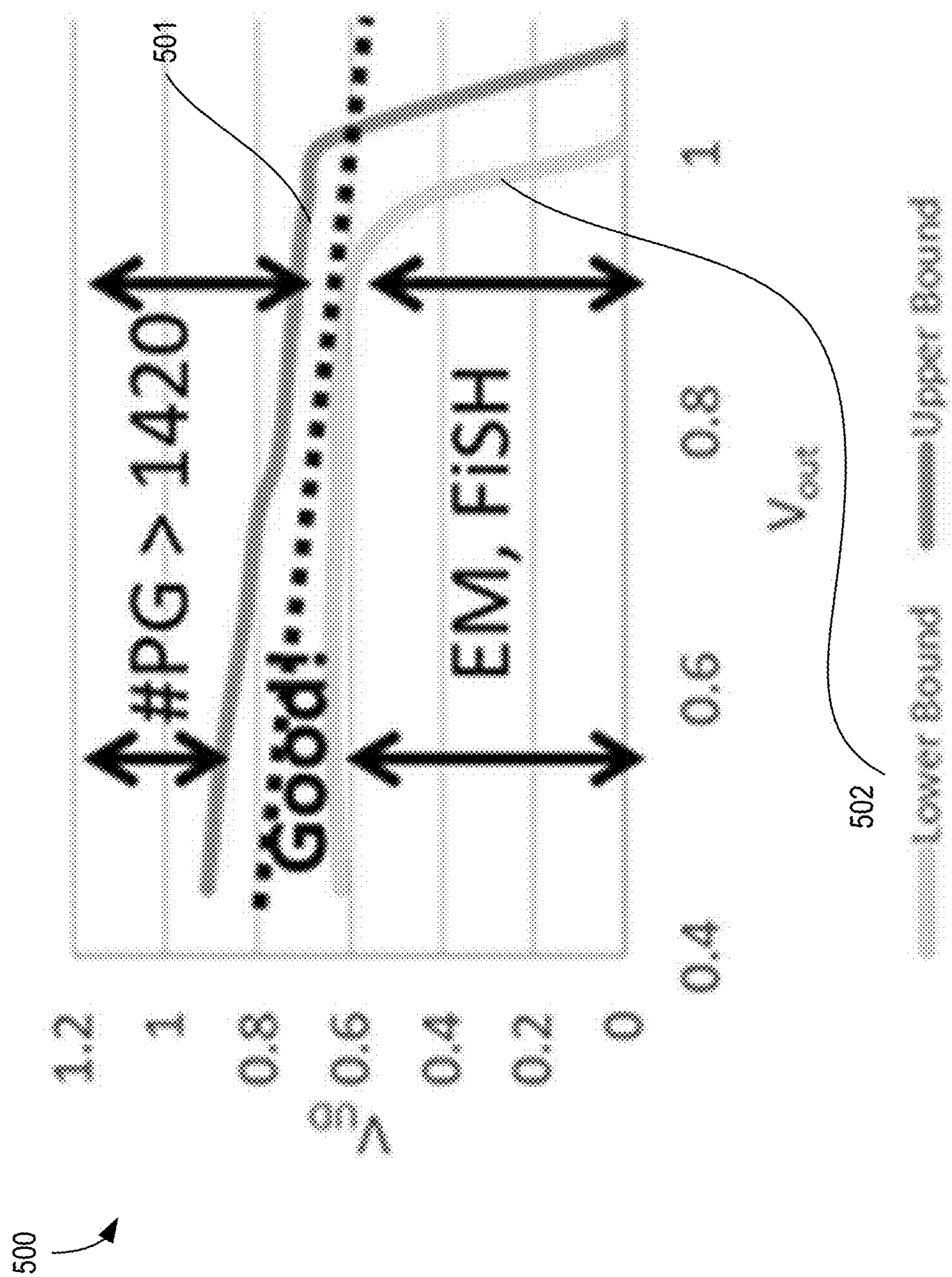
FIG. 5 illustrates a plot showing a range of bias voltages for a device of a primary power gate of the DLDO power gate unit, in accordance with some embodiments.

FIG. 5 illustrates a plot 500 showing a range of bias voltages for a device of a primary power gate of the DLDO power gate unit, in accordance with some embodiments. Here, x-axis is voltage Vout on the output power supply rail, and the y-axis is the analog bias $V_{UD}$ for controlling the primary power gate PPGa. Waveforms 501 and 502 show two operating regions of the primary power gate PPGa, where waveform 501 is the upper bound and waveform 502 is the lower bound. The region between waveforms 501 and 502, for example the dotted line, is the preferred operating region. In this example, if $V_{UD}$ is too low (e.g., below waveform 502), the PPG becomes too strong and may suffer from excessive current density and consequently EM and FiSH issues; and if $V_{UD}$ is too high (e.g., above waveform 501), the PPG becomes too weak which might require more PPGs or frequent assistance by SPGs.

Figure 6:
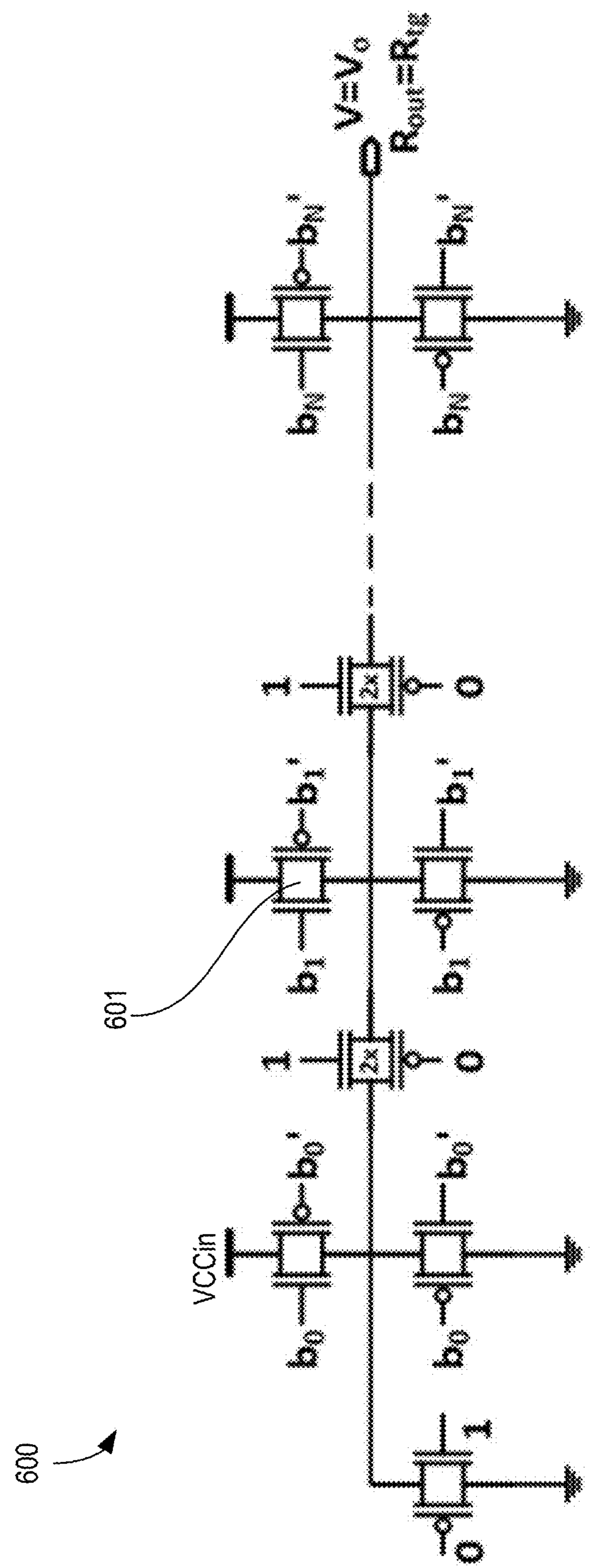
FIG. 6 illustrates a schematic of an R-2R digital-to-analog converter (DAC) used to generate the bias voltage for the device of the primary power gate of the DLDO power gate unit, in accordance with some embodiments.

FIG. 6 illustrates schematic 600 of an R-2R digital-to-analog converter (DAC) used to generate the bias voltage for the primary power gate PPGa of the DLDO power gate unit, in accordance with some embodiments. In some embodiments, $V_{UD}$ or $V_O$ is generated by a R-2R DAC topology that comprises transmission gates (TGs) 601 as switches and as unit resistors. Other DAC embodiments are possible, such as the resistive string R-ladder DAC topology, or switched-capacitor DACs. Different PVT (process, voltage, and temperature) conditions may use different DAC settings to generate the optimum $V_{UD}$ voltage for PPGa. In some embodiments, the bias voltage is generated by a voltage divider.

Figure 7B:
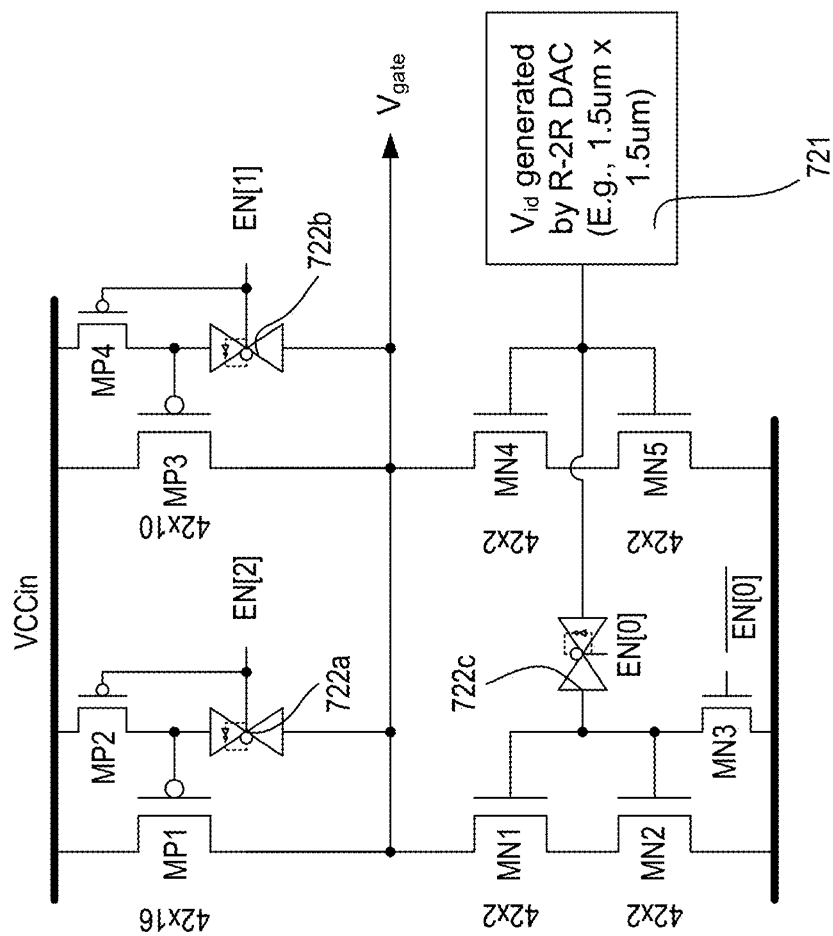
FIG. 7B illustrates a schematic of a PVT-tolerant bias voltage generation circuit for the device of the primary power gate of the DLDO power gate unit, in accordance with some embodiments.
Figure 7A:
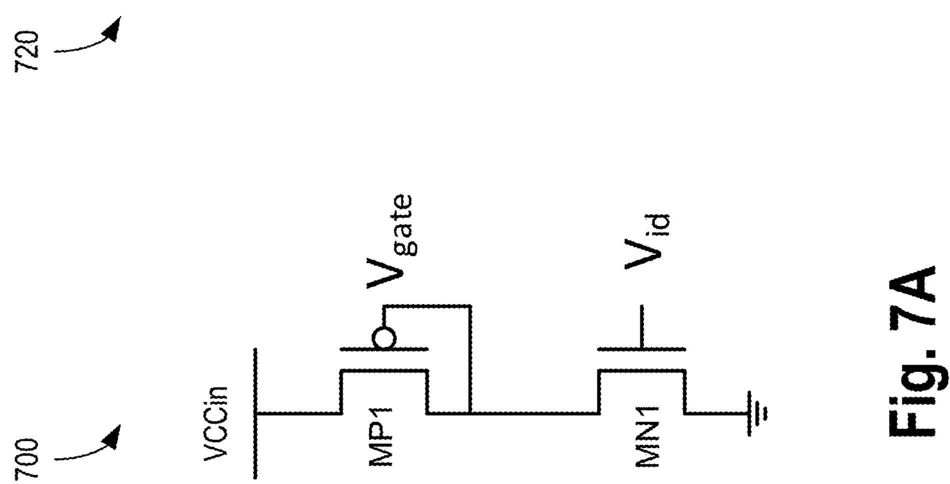
FIG. 7A illustrates a schematic of a process-voltage-temperature (PVT) adaptive bias voltage generation circuit for the device of the primary power gate of the DLDO power gate unit, in accordance with some embodiments.

FIG. 7A illustrates a schematic 700 (or circuit 700) of a PVT adaptive bias voltage generation circuit for the primary power gate PPGa of the DLDO power gate unit, in accordance with some embodiments. Schematic 700 comprises a 2-transistor biasing circuit including a p-type device MP1 coupled in series with an n-type device MN1, where the p-type device MP1 is a diode-connected device that generates a $V_{UD}$ voltage (same as Vgate). Here, $V_{UD}$ voltage lies in a desirable range between reliability risk and high load support. The ideal range of under-drive $V_{UD}$ changes with PVT conditions. The biasing circuit 700 of some embodiments automatically adapts to PVT conditions and continues to generate a $V_{UD}$ voltage in the desirable range even across PVT variations. For example, a detailed circuit analysis reveals that at a slow process corner with higher threshold voltage, the generated bias voltage is lower, while at a fast process corner with lower threshold voltage, the generated bias voltage is higher. In some embodiments, the n-type device MN1 is driven by an analog voltage Vid, generated by a simple resistive DAC such as the one shown in FIG. 6.

FIG. 7B illustrates a schematic 720 (or circuit 720) of a PVT-tolerant bias voltage generation circuit for the primary power gate PPGa of the DLDO power gate unit, in accordance with some embodiments. In some embodiments, the biasing circuit 720 comprises p-type transistors MP1, MP2, MP3, and MP4; n-type transistors MN1, MN2, MN3, MN4, and MN5; pass-gates or transmission gates 722*a*, 722*b*, and 722*c*; and DAC 721 coupled together as shown. Circuit 720 allows for additional tunability of $V_{UD}$ (same as Vgate) in case of extreme imbalance between p-type devices and n-type devices, such as in fast n-type device and slow p-type device, or slow n-type device and fast p-type device arising from process variations.

In some embodiments, transistors MP2, MN3, and MP4 are controllable by an enable bus EN that provides additional tunability of $V_{UD}$. For example, EN[0] (a bit of bus EN) or its inverse controls transistor MN3 and pass-gate 722*c*; EN[1] controls transistor MP4 and pass-gate 722*b*, and EN[2] controls transistor MP2 and pass-gate 722*a*. In some embodiments, transistors, MN1, MN2, MN4, and MN5, are biased by a DAC such as circuit 721.

In some embodiments, circuit 720 is designed to deal with extreme imbalance between p-type and n-type devices. For example, if the p-type devices are weak, two parallel branches of p-type devices, MP1 and MP3, can be enabled to make the p-type network stronger. If the p-type devices are strong, either the device MP1 or device MP3 branch can be disabled. A similar scheme also applies to the n-type network, in accordance with some embodiments. For example, if the n-type devices are weak, a second n-type branch, MN1 and MN2, can be enabled. This MN1 and MN2 branch is disabled in case of strong n-type devices, in accordance with some embodiments.

Figure 8:
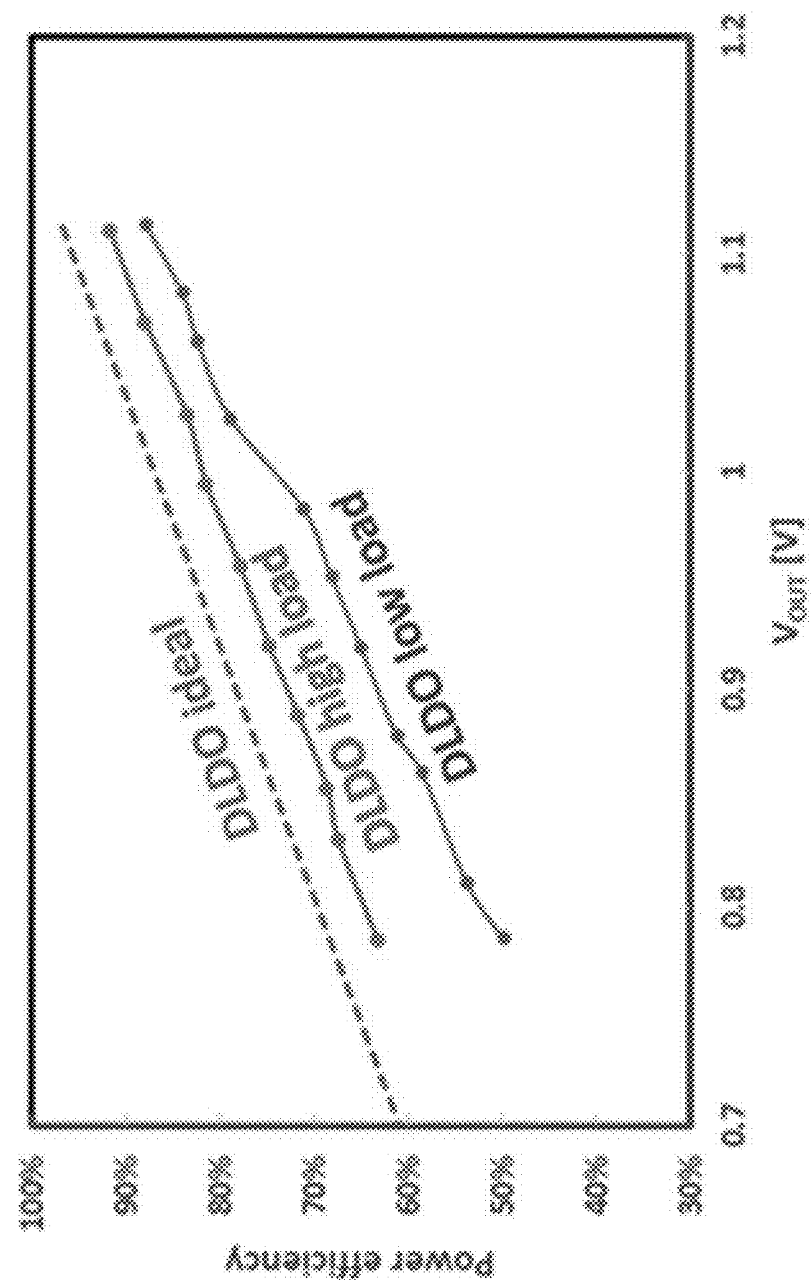
FIG. 8 illustrates a plot showing power efficiency of the DLDO at high and low load conditions, in accordance with some embodiments.

FIG. 8 illustrates plot 800 showing power efficiency of the DLDO at high and low load conditions, in accordance with some embodiments. Here, x-axis is output voltage Vout (of the output power supply line) in volts, and the y-axis is power efficiency in percentage. In this example, at high (low) load conditions, the measured DLDO power efficiency is 5.5% (13.6%) below the ideal DLDO power efficiency.

Figure 9:
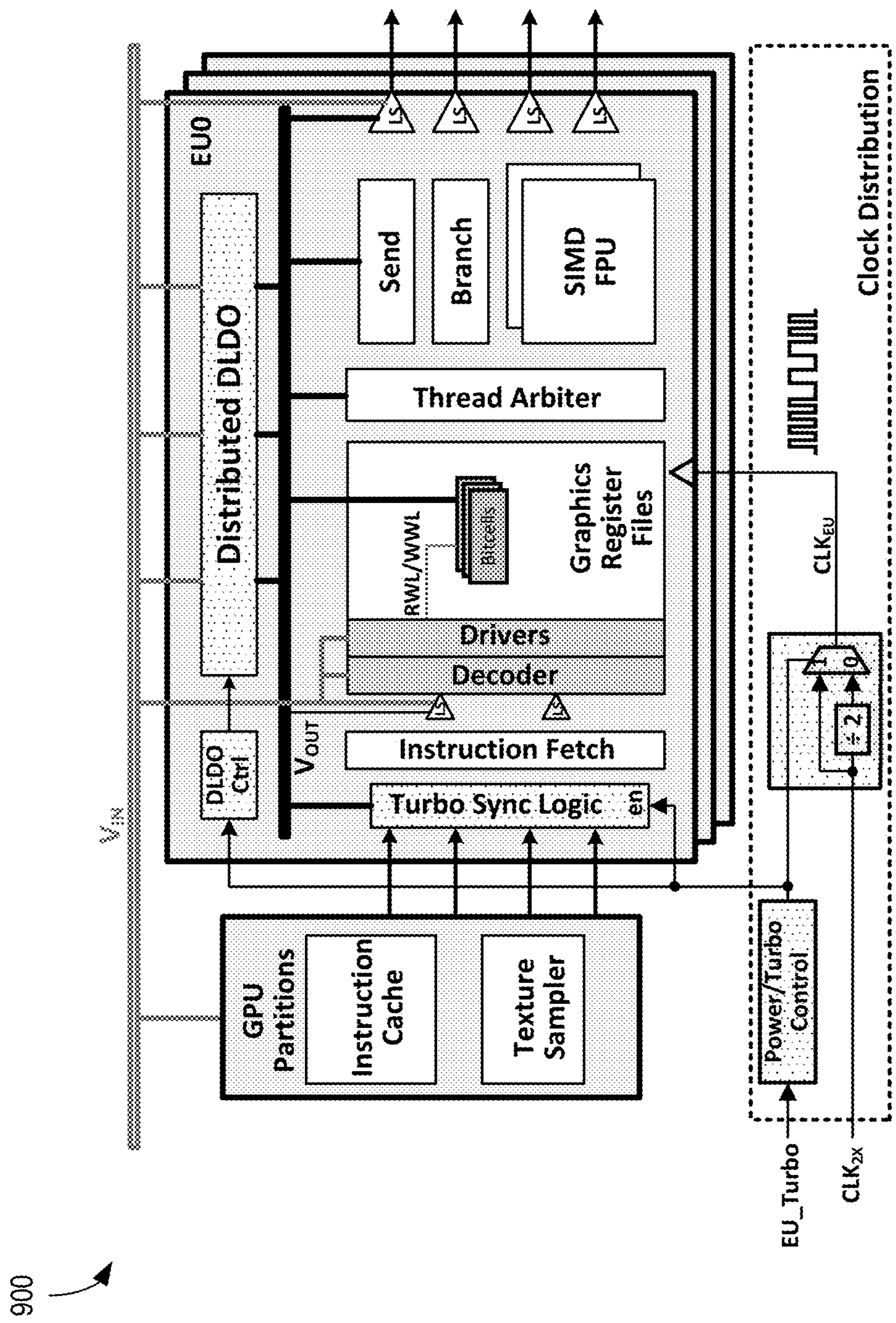
FIG. 9 illustrates part of a graphics processor chip using the distributive DLDO architecture, in accordance with some embodiments.

FIG. 9 illustrates part 900 (or architecture 900) of a graphics processor chip using the distributive DLDO architecture, in accordance with some embodiments. Here, architecture 900 comprises a plurality of execution units (EU 0-N, where 'N' is an integer greater than 0); graphics processing unit (GPU) partitions; distributed DLDO with distributed power gates (e.g., 103*a/b*), clock distribution, and ungated power supply $V_{IN}$. In some embodiments, each EU further includes a DLDO controller (e.g., controller 102), gated power supply $V_{OUT}$, and loads such as Single Instruction Multiple Data (SIMD) Floating Point Unit (FPU), instruction fetch logic, thread arbiter, send logic, branch logic, and graphics register files with bit-cells. In some embodiments, graphics register decoders are powered by Vin. The GPU may comprise an instruction cache and a texture sampler. The clock distribution logic may include power/turbo control and clock frequency adjustment circuit that provides clock $CLK_{EU}$ for the execution unit. While various embodiments disclose PPGa device coupled to VCCin and PPGd device coupled to Vout, the positions of these primary gate devices can be swapped. For example, PPGa device is coupled in series with PPGd device such that PPGa device is coupled to Vout while PPGd device is coupled to Vccin.

Figure 10:
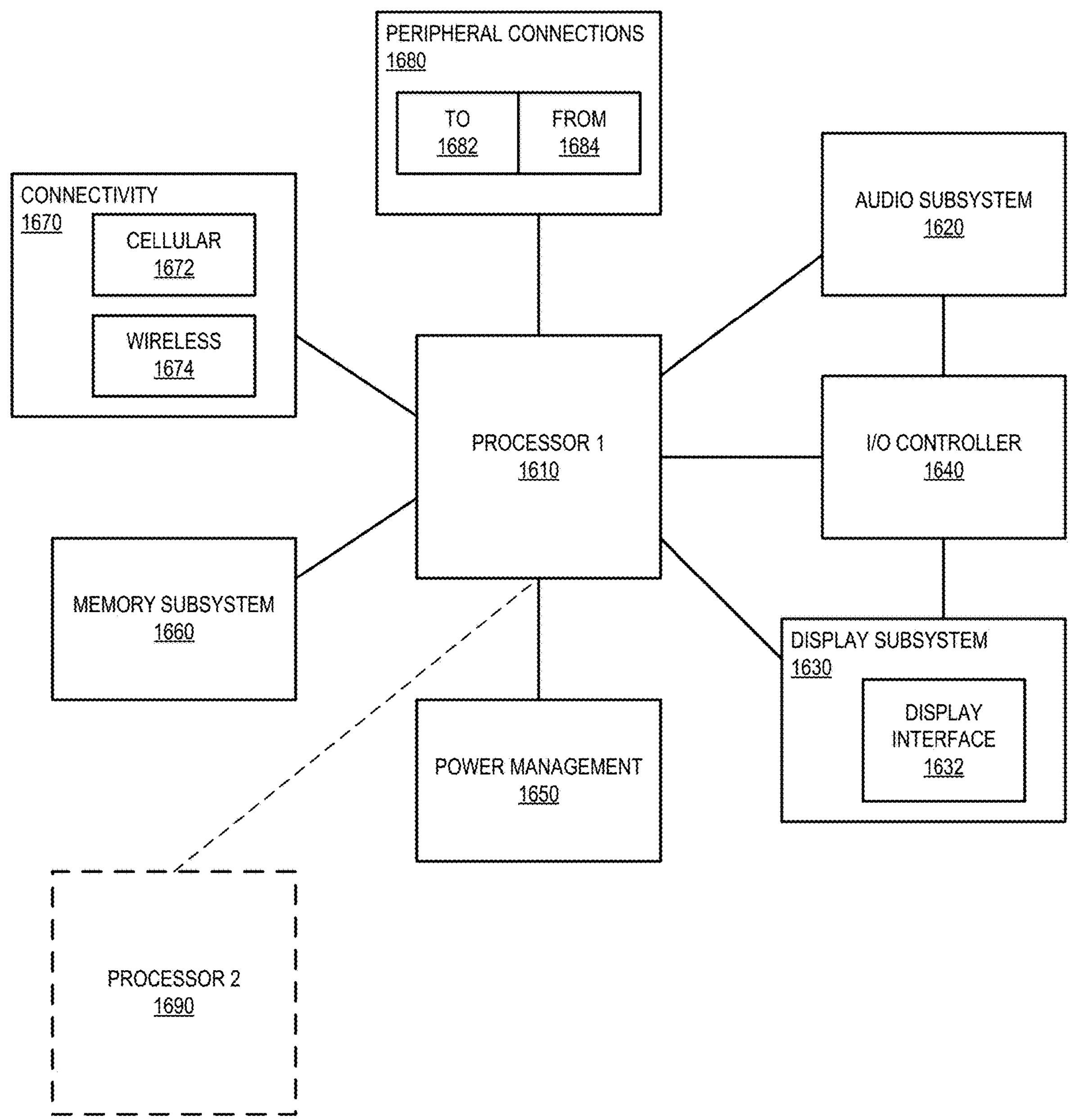
FIG. 10 illustrates a smart device or a computer system or an SoC (System-on-Chip) having a distributive DLDO architecture, according to some embodiments of the disclosure.

FIG. 10 illustrates a smart device or a computer system or a SoC (System-on-Chip) having a distributive DLDO architecture, according to some embodiments of the disclosure. FIG. 10 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 having a distributive DLDO architecture, according to some embodiments discussed. Other blocks of the computing device 1600 may also include apparatus for PPM detection, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:

a first device coupled to a first power supply rail;

a second device coupled in series with the first device, wherein the second device is coupled to a second power supply rail; and a third device coupled to the first and second power supply rails, wherein the first device is controllable by a first input, wherein the second device is controllable by a second input, wherein the third device is controllable by a third input, and wherein the first input is an analog bias between a high-power supply level and a ground supply level.

2. The apparatus of claim 1, wherein the first power supply rail is to provide an ungated power supply.

3. The apparatus of claim 1, wherein the second power supply is to provide a gated power supply.

4. The apparatus of claim 1 comprises a bias circuitry to generate the analog bias.

5. The apparatus of claim 4, wherein the bias circuitry comprises a digital-to-analog converter.

6. The apparatus of claim 1, wherein the second device is turned on during one of: a low-power mode, a high-power mode, or a bypass mode.

7. The apparatus of claim 1, wherein the second device is to turn on before the third device is turned on.

8. The apparatus of claim 1, wherein the second and third inputs are generated by a driver circuitry comprising: a NOR gate, a NAND gate, and a single sequential logic to provide inputs to the NOR gate and the NAND gate.

9. The apparatus of claim 1, wherein the first, second, and third devices are p-type transistors.

10. The apparatus of claim 1 comprises:

a tunable replica circuit to replicate a critical timing path; and a time-to-digital converter coupled to the tunable replica circuit, wherein an output of the tunable replica circuit is input to the time-to-digital converter which is to determine a timing margin of the critical timing path with reference to a clock.

11. The apparatus of claim 10 comprises a controller to process the timing margin and to control the first, second, or third inputs according to the timing margin.

12. The apparatus of claim 1 comprises:

a first comparator coupled to the second power supply rail and a first reference;

a second comparator coupled to the second power supply rail and a second reference; and a controller to receive outputs of the first and second comparators and to control the first, second, or third inputs according to the outputs of the first and second comparators.

13. An apparatus comprising:

a first power supply rail to provide an un-gated power supply;

a second power supply rail to provide a gated power supply;

a first power gate including:

a first transistor coupled to the first power supply rail and controllable by an analog bias; and a second transistor coupled in series with the first transistor and coupled to the second power supply rail, wherein the first power gate is controllable by a first input; and a second power gate coupled in parallel with the first power gate, wherein the second power gate is controllable by a second input separate from the first input.

14. The apparatus of claim 13 comprises:

a first comparator coupled to the second power supply rail and a first reference;

a second comparator coupled to the second power supply rail and a second reference; and a controller to receive outputs of the first and second comparators and to control the first or second inputs according to the outputs of the first and second comparators.

15. The apparatus of claim 13 comprises:

a tunable critical path replica circuit coupled to the second power supply rail;

a time-to-digital converter (TDC) coupled to the second power supply rail or the first power supply rail, wherein the TDC is coupled to the tunable critical path replica circuit; and a controller to receive an output of the TDC to control the first or second inputs according to the outputs of the TDC.

16. The apparatus of claim 13, wherein the second transistor of the first power gate and the second power gate are controllable by a single flip-flop.

17. The apparatus of claim 12, wherein the analog bias is generated by one or more of: a digital-to-analog converter, a diode-connected device, or a voltage divider.

18. A system comprising:

a memory;

a processor coupled to the memory, wherein the processor includes a digital low dropout (DLDO) regulator which comprises:

a first device coupled to a first power supply rail;

a second device coupled in series with the first device, wherein the second device is coupled to a second power supply rail; and a third device coupled to the first and second power supply rails, wherein the first device is controllable by a first input, wherein the second device is controllable by a second input, and wherein the third device is controllable by a third input, wherein the first input is an analog bias between a high-power supply level and a ground supply level; and a wireless interface to allow the processor to communicate with another system.

19. The system of claim 18, wherein the first, second, and third devices are part of a power gate, wherein the DLDO comprises multiple power gates distributed in the processor and controllable by a controller.

20. The system of claim 18, wherein the second and third inputs are generated by a driver circuitry comprising: a NOR gate, a NAND gate, and a single sequential logic to provide inputs to the NOR gate and the NAND gate.

* * * * *